United States Patent [19]

Massey et al.

[11] 4,421,722
[45] Dec. 20, 1983

[54] ADIABATIC EXPANSION ORIFICE ASSEMBLY FOR PASSING A SLURRY FROM A HIGH PRESSURE REGION TO A LOW PRESSURE REGION

[75] Inventors: Lester G. Massey, Moreland Hills; David A. George, Park Forest; Robert I. Brabets, Lombard; William A. Abel, Joliet, all of Ill.

[73] Assignee: CNG Research Company, Cleveland, Ohio

[21] Appl. No.: 321,750

[22] Filed: Nov. 16, 1981

Related U.S. Application Data

[63] Continuation of Ser. No. 127,739, Mar. 6, 1980, abandoned.

[51] Int. Cl.³ .............................. B01J 8/00; B05B 1/00
[52] U.S. Cl. .................................... 422/129; 239/424; 239/591; 239/592; 239/600; 239/602
[58] Field of Search ............... 422/129, 150, 157, 158; 239/592, 600, 424, 601, 602, 591

[56] References Cited

U.S. PATENT DOCUMENTS 2,823,982  2/1958  Saladin et al. ...................... 422/158
3,705,693  12/1972  Franz .................................. 239/600

FOREIGN PATENT DOCUMENTS 763490  1/1934  France .
1142218  2/1969  United Kingdom ................ 239/602

OTHER PUBLICATIONS

Pelton et al.–"Nasa Tech. Support Pack on Screw-Extruded Cont. Coal Proc. Method and Means. Nasa Contract No. NAS-7-100 (1977).

*Primary Examiner*—Michael S. Marcus
*Attorney, Agent, or Firm*—Allegretti, Newitt, Witcoff & McAndrews, Ltd.

[57] ABSTRACT

An adiabatic expansion orifice assembly for substantially instantaneously passing a coal slurry from a high pressure region to a low pressure region and a corresponding process are disclosed. The orifice assembly includes a housing having an exit end wall and a passageway through the housing. The passageway terminates in a substantially cylindrical portion or opening adjacent the exit end wall. The effective dimensions of the opening provide a flow rate whereby the slurry passes from the high pressure region through the opening to the low pressure region in less than a predetermined period of time, most preferably less than approximately 0.3 microseconds.

The corresponding process involves passing a coal slurry through an orifice in less than the predetermined period of time. This process provides substantially instantaneous transition from a high pressure region to a low pressure region.

21 Claims, 8 Drawing Figures

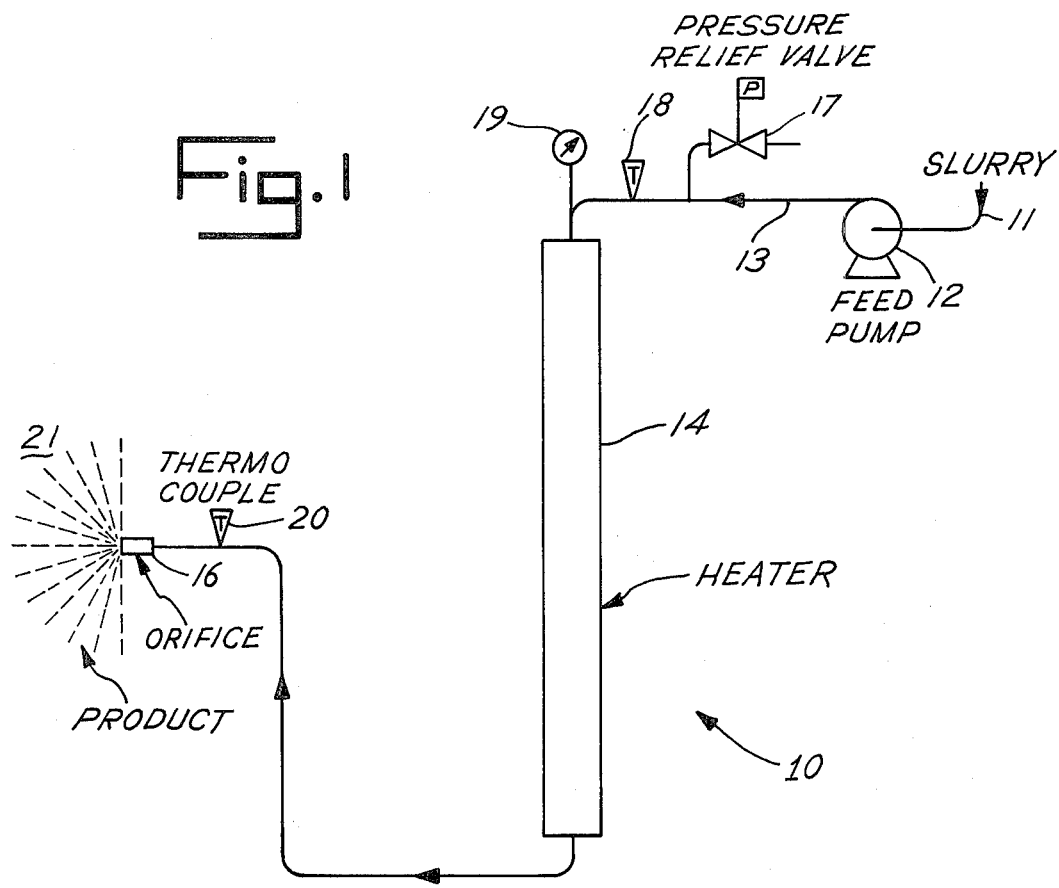

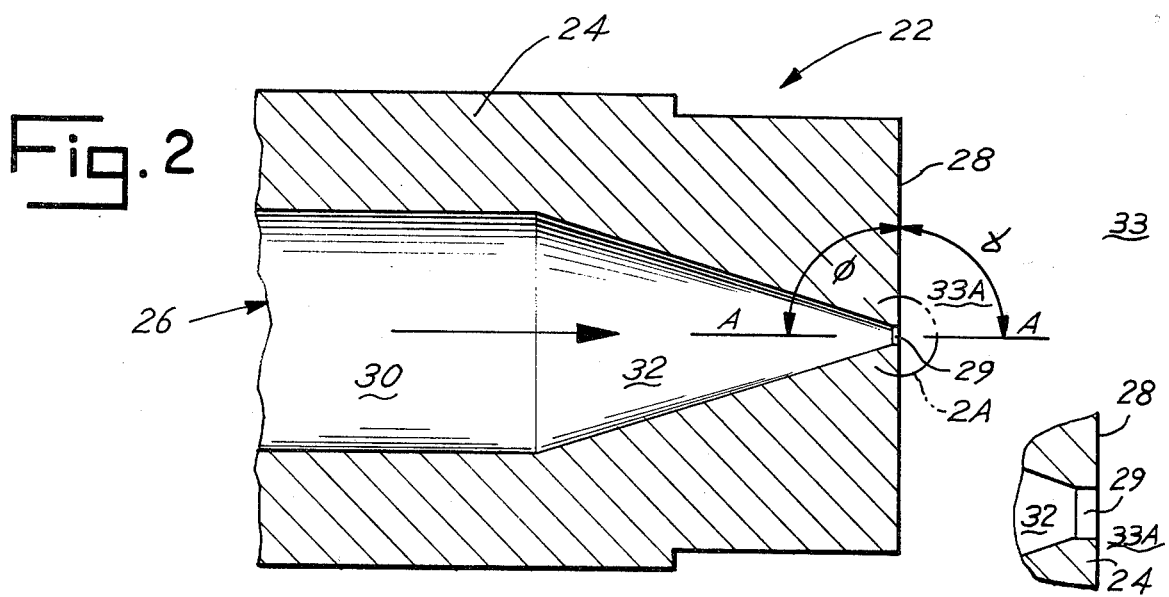
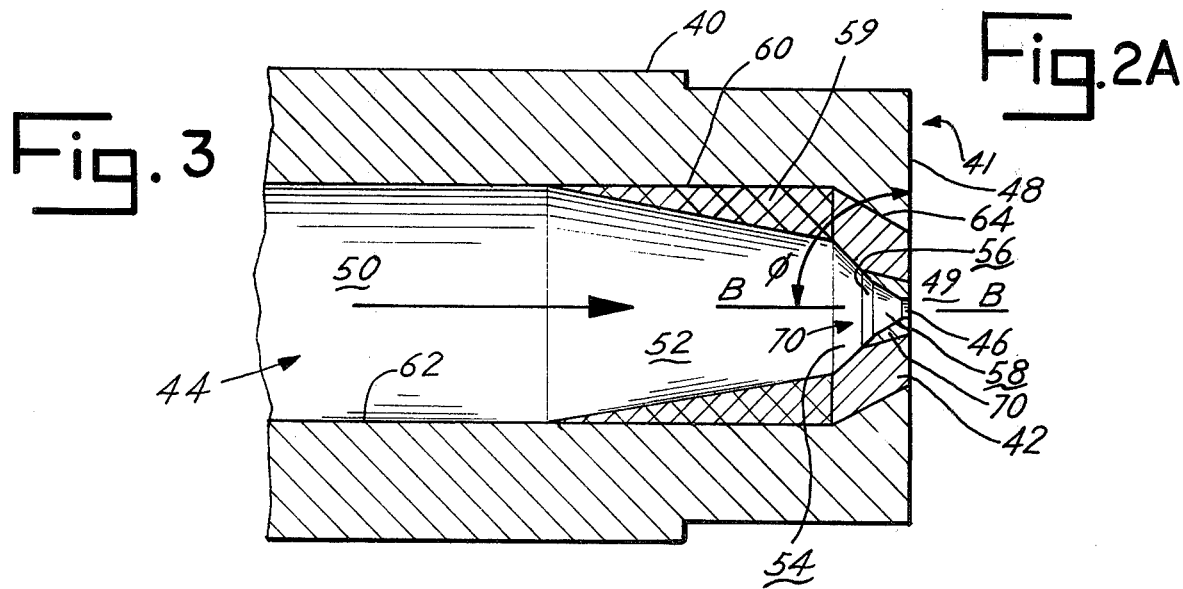
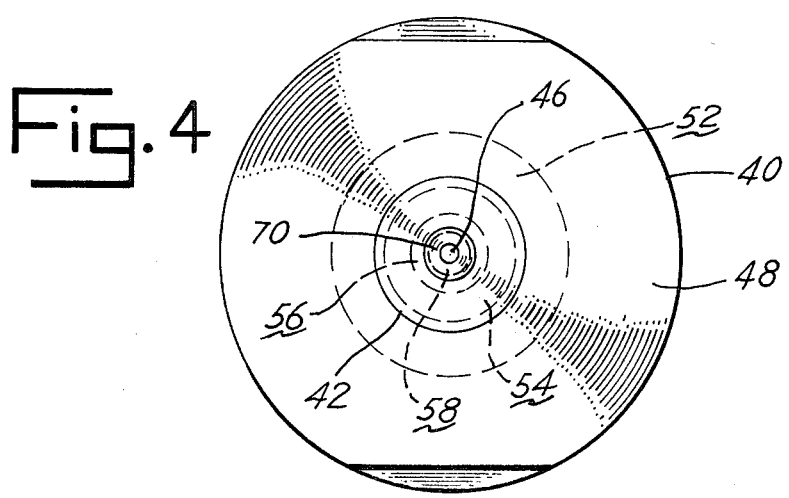

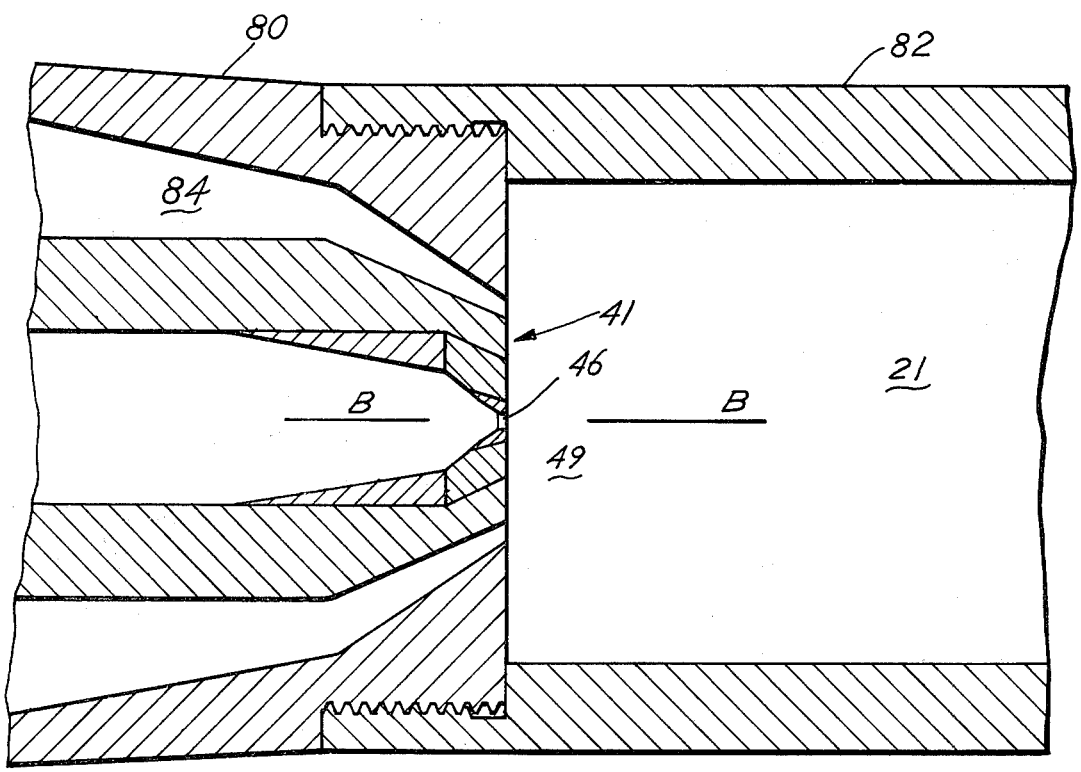

ADIABATIC EXPANSION ORIFICE ASSEMBLY FOR PASSING A SLURRY FROM A HIGH PRESSURE REGION TO A LOW PRESSURE REGION

This is a continuation of application Ser. No. 127,739 filed Mar. 6, 1980 now abandoned.

BACKGROUND OF THE INVENTION

The present invention relates generally to an explosive comminution system. More particularly, the present invention relates to an adiabatic expansion orifice assembly and a process for substantially and instantaneously passing a slurry from a high pressure region to a low pressure region.

Explosive comminution is a process wherein a porous friable solid, such as coal or other hydrocarbonaceous material, is explosively shattered into very small particles. Explosive shattering results primarily from the sudden creation of strong internal stress forces within the porous friable solid.

As set forth, in detail, in the co-pending application of Massey et al., Ser. No. 1127740 filed Mar. 6, 1980, entitled "Method For Separating Undesired Components From Coal By An Explosive Type Comminution Process" (hereinafter "the Massey application" or "the Massey process"), the explosive comminution of coal is preferably accomplished by raising the pressure and temperature of a coal-fluid slurry, preferably coal-water, above the critical pressure and critical temperature of the slurry. Under these conditions, supercritically heated and pressurized liquid is forced into the pores of the coal.

The slurry is then passed through an adiabatic expansion orifice assembly to decrease the pressure imposed on the slurry in a substantially instantaneous manner. With this pressure drop, the volatile slurry fluid within the coal pores expands, figuratively "exploding," to shatter the coal into small particles.

The Massey process substantially enhances the separation of the valuable hydrocarbonaceous "fuel" particles from the mineral "waste" particles by reducing the size of the comminuted "fuel" particles without substantially reducing the size of the "waste" particles. Specifically, the average "fuel" particles are approximately one-third or less the average size of the "waste" particles. The ease of separating waste particles from fuel particles, referred to as "selectivity," relates to an important aspect of this invention.

Conventional orifice assemblies used in the explosive comminution process have a converging-diverging configuration, i.e., a venturi design. Investigations leading to the present invention established that such configuration causes a relatively gradual pressure drop within the orifice assembly and a corresponding gradual expansion of the slurry liquid within the coal pores. The result of such a gradual pressure drop is to decrease the amount of comminution energy; that is, the configuration of the conventional orifice decreases the efficiency of the explosive comminution process.

In conventional systems, the orifice also directs the slurry into a relatively small collection chamber. The investigations and research leading to the present invention also established that the exploding solid matter of the slurry impinges upon the chamber wall and upon the diverging orifice configuration, resulting in additional mechanical-type comminution. The investigations and research showed further that although this impingement slightly improves overall comminution, it has a detrimental effect on selectivity. The larger "waste" particles produced by the Massey process are comminuted by the impingement action thereby making separation from the smaller "fuel" particles more difficult.

The present invention is designed to improve upon these and other aspects of the prior art.

SUMMARY OF THE INVENTION

Thus an object of the present invention is to provide a comminution orifice assembly and process whereby a slurry is passed substantially instantaneously from a high pressure region to a low pressure region. Another object is to provide an orifice assembly and process for passing the slurry in less than a predetermined period of time, such that comminution energy is substantially maximized and energy losses are substantially reduced.

Still another object of the present invention is an orifice assembly and process for passing a slurry into an unobstructed collection chamber, substantially avoiding mechanical impingement of the coal against the chamber or nozzle walls. It is also an object of the present invention to provide a long lasting, readily and inexpensively manufactured and maintained orifice assembly for a comminution process.

In a principal aspect, the present invention is an improved adiabatic expansion orifice assembly for an explosive comminution system and an improved process for passing a slurry from a high pressure region of a comminution system to a low pressure region. The orifice assembly and process enhance comminution and by-product separation in the Massey process.

The orifice assembly provides, and the process involves, substantially instantaneous passage of the slurry from the high pressure, explosive comminution vessel to a low pressure zone or region. More particularly, the slurry is passed to the low pressure zone in less than a predetermined period of time, preferably about ten (10) microseconds.

The orifice assembly includes a housing having an exit wall and a passageway therethrough. The passageway includes a substantially cylindrical end portion or opening adjacent the exit end wall.

The opening is sized to permit the slurry to pass substantially instantaneously therethrough, i.e., in less than the predetermined period of time. The opening has an axis that cooperates with the exit end wall to define an exit angle of equal to or less than approximately ninety degrees (90°).

This configuration avoids the gradual depressurization and resultant energy loss associated with conventional, presently known orifice assemblies. It further facilitates selectivity and waste separation by substantially eliminating the slurry impingement produced by conventional nozzles.

These and other features, objects and advantages of the present invention are set forth or apparent in the detailed description which follows.

BRIEF DESCRIPTION OF THE DRAWINGS

Preferred embodiments of the present invention are set forth and described in the following section hereof with reference to the drawing wherein:

FIG. 1 is a schematic diagram of an explosive comminution apparatus including a preferred embodiment of the present invention;

FIG. 2 is a cross-sectional view of one preferred embodiment of the present invention;

FIG. 2A is an enlarged partial view of the preferred embodiment shown in FIG. 2;

FIG. 3 is a cross-sectional view of another preferred embodiment of the present invention.

FIG. 4 is a front-end view of the preferred embodiment shown in FIG. 3;

FIG. 5 is a cross-sectional view of still another preferred embodiment of the present invention.

DESCRIPTION OF VARIOUS PREFERRED EMBODIMENTS

Figure 5A:
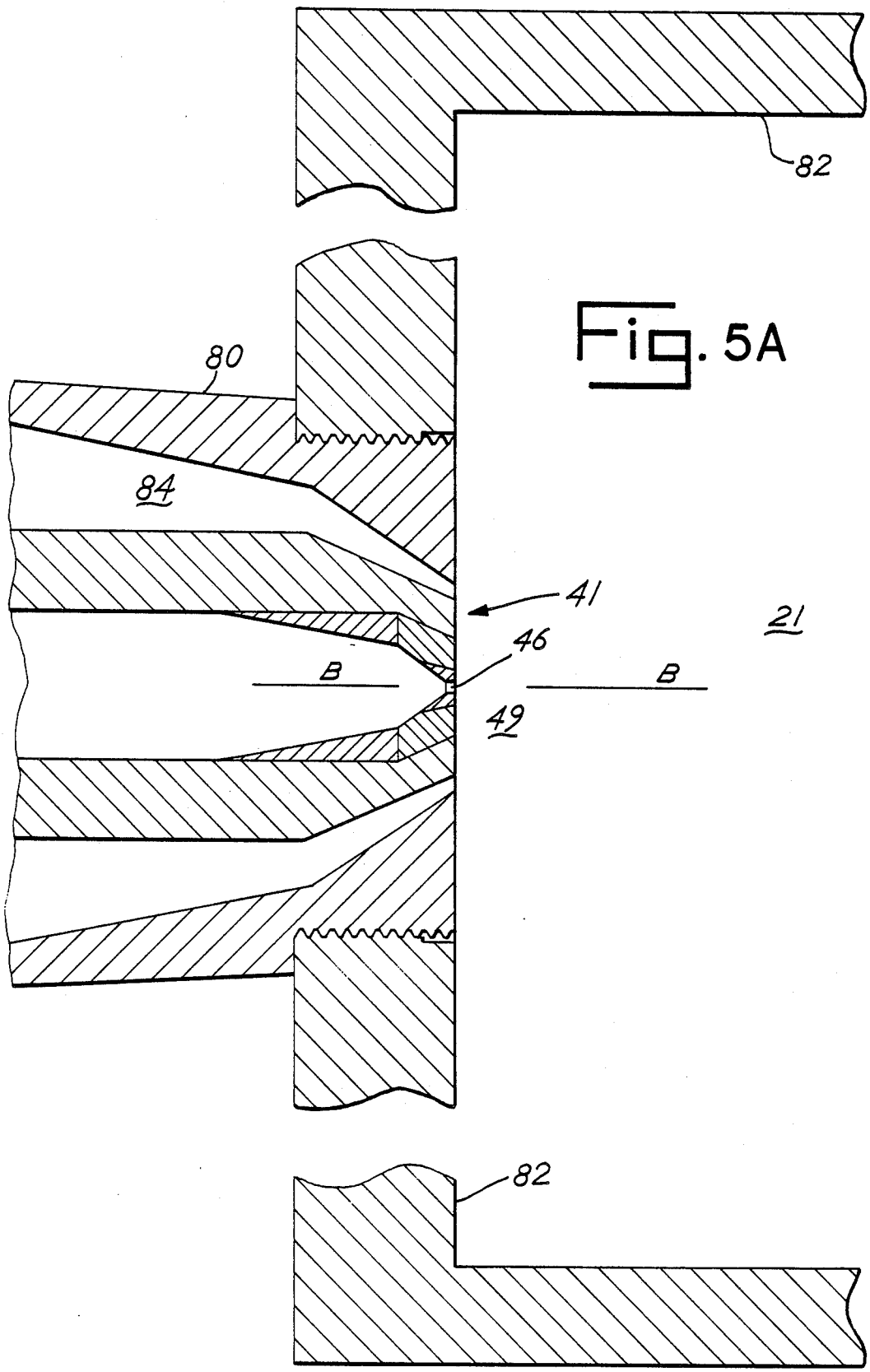
FIG. 5A is an alternative embodiment of the invention shown in FIG. 5.

Referring to FIG. 1, a preferred system 10 for explosive comminution is shown in schematic form. The system 10 and its operation are described in detail in the Massey application, and the teachings thereof are fully incorporated herein by reference.

Briefly, operation of the explosive comminution system 10 begins with the preparation of a slurry including a porous or permeable, friable solid (such as, for example, coal, oil shale, or iron ore) and a liquid suitable for forming a slurry with the solid (such as, for example, water, methanol or liquefied gases). The present invention is particularly applicable to a slurry of coal and water.

The slurry passes via a line 11 to a feed pump 12, which delivers the slurry through a line 13 to a heating chamber 14. The feed pump 12 maintains the slurry pressure in the heating chamber 14 above the critical pressure of the slurry liquid. For a coal-water slurry, the pressure in the heating chamber 14 is preferably maintained above approximately 4,000 pounds per square inch ("psia"), but preferably less than approximately 16,000 psia. A particularly preferred pressure range is 6,000 psia to 14,000 psia.

The temperature of the slurry is raised in the heating chamber 14 to a level above the critical temperature of the slurry fluid. For a coal-water slurry, the temperature is preferably raised above 705° F., but preferably less than approximately 1,000° F. A particularly preferred temperature range is between 750° F. and 950° F.

The slurry is discharged through a preferred embodiment of the present invention, designated orifice 16, into a low pressure environment, such as a collection chamber 21. The orifice 16 provides substantially instantaneous adiabatic transition from the pressure and temperature conditions within the heating chamber 14 to the conditions of the collection chamber 21. The preferred pressure range within the collection chamber 21 is approximately 1 atmosphere to 5 atmospheres. The preferred temperature therein is determined by the selected operating pressure, but is preferably above the dew point of the slurry liquid.

The system 10 also includes a pressure valve 17 to relieve excessive pressure within the system 10. Conditions within the system 10 are monitored by a pair of thermocouples 18, 20 and a pressure gauge 19.

Referring to FIG. 2, an orifice assembly 22 is shown more particularly illustrating the orifice 16 of FIG. 1. The orifice assembly 22 includes a housing 24, having an interior chamber or passageway 26 therethrough and a substantially planar exit end wall 28. The passageway 26 includes a first zone or opening 29, adjacent the exit end wall 28, a pair of zones 30, 32, respectively, and a longitudinal axis A—A. The opening 29 and zones 30, 32 are substantially concentric with respect to the axis A—A.

In this preferred embodiment, the opening 29 and first zone 30 are substantially cylindrical. As shown, the opening 29 is much smaller in diameter and much shorter in length than the first zone 30. The second zone 32 is substantially frusto-conical, interposing and interconnecting the first zone 30 and the opening 29, to provide a relatively smooth non-turbulent flow to the opening 29.

As set forth in the Massey application, explosive comminution of coal is performed at or above the critical temperature and pressure of water to insure most effective separation of the combustible hydrocarbonaceous "fuel" portion of the coal from the ash-forming mineral "waste" portion. At these conditions, water forms a dense, supercritical fluid having greater inertia and energy per unit volume than superheated steam and providing more rapid expansion than high temperature water.

The orifice assembly 22 substantially maximizes the use of system conditions in providing comminution, e.g., the percentage of total energy available for comminution and the rapidity of the slurry's expansion, by: (1) maximizing the pressure drop across the opening 29, and (2) minimizing the length of time for passage through the opening 29. More particularly, the opening 29 is dimensioned to pass the slurry therethrough in less than approximately ten (10) microseconds, preferably in less than approximately one (1) microsecond, and more preferably in less than approximately three-tenths (0.3) of a microsecond.

Although the dimensions of the opening 29 will vary in accordance with system pressure and the slurry composition and flow characteristics, the opening 29 approximates a "knife edge" orifice. The knife-edge opening 29 substantially avoids the gradual depressurization experienced with nozzles of the conventional venturi type. The pressure drop produced by the orifice assembly 22 is thus more severe and more sudden than prior art orifices.

Investigations have shown that the preferred length of the opening 29 should be minimized; for the slurries and operating conditions described herein about seventy five (75) to about one hundred and fifty (150) micrometers is suitable. Maximum solid particle size in the slurry is substantially determined by available orifice diameter.

Studies relative to the present invention have established that the slurry of the Massey process emerges from the orifice assembly 22 in a substantially hemispherical explosion pattern. This is due to the rapid nondirectional flashing of the high energy slurry liquid. Theoretically, this pattern extends in all directions up to about one hundred thirty-five degrees (135°) from the exit longitudinal axis A—A of the orifice assembly 22.

Particle shattering occurs over a distance from the exit end wall 28 of at least ten (10) times the diameter of the opening 29, and the shattering or explosion propels the shattered particles for a finite further distance. The maximum travel distance of shattered particles from the opening 29 can be theoretically and/or experimentally established. The area through which shattered particles travel, equal to the maximum travel distance in all directions of the explosion pattern, is referred to herein as "the path of the exploding solids."

Referring again to FIG. 2, the exit end wall 28 of the housing 24 defines an exit angle, designated $\phi$, with respect to the longitudinal axis A—A of the orifice assembly 22. The angle $\phi$ shown in FIG. 2 is equal to or less than approximately ninety degrees (90°) and preferably, in theory, is in the range of forty-five degrees (45°) to ninety degrees (90°). Stated another way, angle $\phi$ is such that $45° \leq \phi \leq 90°$, and angle $\gamma$, also shown in FIG. 2, is such that $90° \leq \gamma \leq 135$, and the relationship between $\phi$ and $\gamma$ is such that $\phi + \gamma = 180°$.

The orifice assembly 22 further includes a collection zone 33 (partially shown in FIG. 2), which the slurry enters through the opening 29. The collection chamber 33 defines an expansion zone 33A which is free from obstruction within the path of the exploding solids.

The exit angle $\phi$ and unobstructed expansion zone 33A substantially minimize comminution due to particle impingement upon a solid surface. Shattering of the waste by-product is therefore substantially reduced as compared with presently known orifice assemblies, and selectivity is substantially facilitated.

Empirical determinations relative to the present invention show that an expansion zone 33A of twenty (20) times the diameter of the opening 29 substantially increases selectivity. Expansion zones 33A of fifty (50) and one hundred (100) times the diameter of the opening 29 are preferred.

A second embodiment of the present invention is shown in FIGS. 3 and 4. The orifice assembly 41 includes a housing 40, defining a substantially cylindrical chamber 60 therein, an insert 42 and a tapered member 59. The insert 42 and tapered member 59 are adapted to fit within the housing 40 or more particularly the chamber 60.

As shown, the housing 40, insert 42 and tapered member 59 cooperatively define a passage 44 through the housing 40, an exit end wall 48 and an orifice axis B—B. The exit end wall 48 and axis B—B define an exit angle $\phi$, which is equal to or less than approximately 90° and preferably in the range of 45° to 90°. The orifice assembly 41 also defines an expansion zone 49, substantially identical to the expansion zone 33A of the embodiment shown in FIG. 2.

In this preferred embodiment, the passageway 44 has substantially frusto-conical zones 52, 54, 56 and 58 interconnecting a first substantially cylindrical zone 50 and a substantially cylindrical opening 46 through the exit end wall 48. Zone 50 is defined by a portion 62 of chamber 60. The opening 46 is substantially identical to the opening 29 shown in FIGS. 2 and 2A. The zones 52, 54, 56, 58 vary in configuration such that the passageway 44 constricts or narrows towards the opening 46 to substantially minimize flow turbulence and coal agglomeration.

The housing 40 includes a tapered flange 64 that defines an inner frusto conical surface opening toward the internal chamber 60, thereby partially closing the chamber 60 adjacent the exit end wall 48. The insert 42 includes an outer frusto conical surface, such that the insert slidably fits within the chamber 60. The outer frusto conical surface of the insert 42 contacts and is adapted to engage and abut the inner frusto conical surface of the flange 64. The smallest diameter of the frusto conical portion of the tapered flange is larger than at least some portion, preferably the largest portion, of the frusto conical surface of the insert 42, such that the frusto conical flange 64 maintains and secures the insert 42 within the housing 40 against the flurry flow in the advantageous manner previously described.

The tapered member 59 fits within the chamber 60 slideably engaging the wall thereof. The tapered member 59 abuts against the insert 42, opposite the flange 64. As shown, the insert 42 and tapered member 52 provide the frusto-conical zones 52, 54, 56, 58 of passageway 44.

The passage of slurry through the orifice assembly 41 urges the tapered member 59 against the insert 42 and the insert 42 against the flange 64. The resulting pressure against the insert 42 and the tapered member 59 substantially avoids leakage of the slurry therebetween.

The insert 42 is replaceable, such that the orifice assembly 41 can be readily maintained and serviced against the highly eroding and abrasive slurry. Erosion enlarges the opening 46 adjacent to exit end wall 48, eventually altering its substantially cylindrical shape. A portion 70 of the insert 42, defining the opening 46, is preferably made of a highly wear resistant material, e.g., composite diamond, such that the life of the orifice assembly 16 is substantially increased, reducing overall costs of using the nozzle and costs of this invention. The remainder of the insert 42 and housing 40 are preferably tungsten carbide and stainless steel, respectively.

Figure 6:
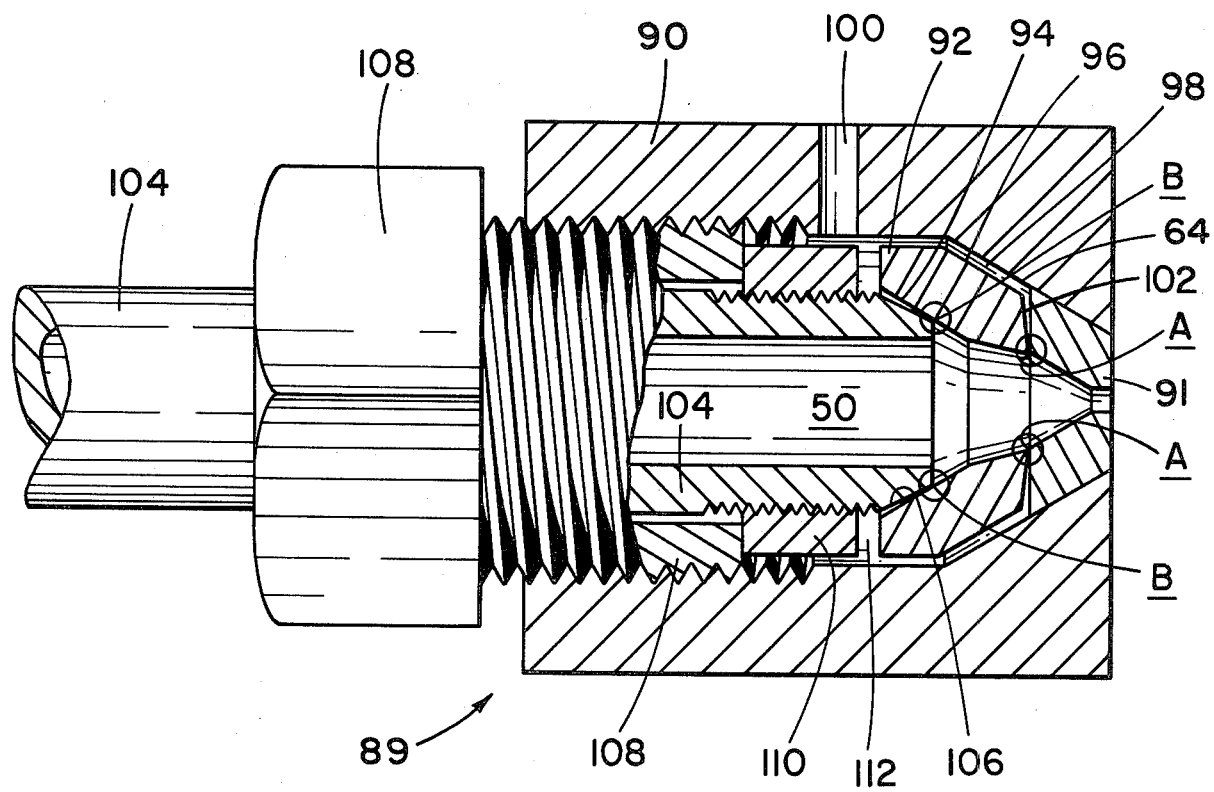
FIG. 6 is a cross-sectional view of a particularly preferred embodiment of the present invention.

Another particularly preferred embodiment of the present invention is shown in the orifice assembly 89 of FIG. 6. This embodiment includes a housing 90 and insert 91 substantially equivalent to the housing 40 and insert 42 shown in and described with respect to FIGS. 3 and 4. However, the details of the insert 42 have not been repeated in insert 91 of FIG. 6. Moreover, the housing 90 is internally threaded at one end opposite the flange 64, and the flange 64 is enlarged such that it extends beyond the insert 91. The housing 90 also includes a venting passage 100.

The orifice assembly 89 includes a passage-restricting member 92, a high pressure tubing 104 and a retaining nut 108. As shown, the passage restricting member 92 has a first beveled surface 102 adapted to engage the insert 91 in a substantially circular line contact, designated A.

The passage restricting member 92 is urged against the insert 91 by the high pressure tubing 104 and retaining nut 108. The high pressure tubing 104 has a beveled end 106 which engages the passage restricting member 92 in a substantially circular line contact, designated B.

The high pressure tubing 104 is externally threaded adjacent to the beveled end 106 to receive a retaining collar 110. The retaining nut 108 receives the high pressure tubing 104 and is threadably received by the housing 90.

Under the pressure of the retaining nut 108, the passage restricting member 92 and high pressure tubing 104 align with respect to the insert 91. The pressure of retaining nut 108 cooperates with the high operating pressure of the slurry (greater than about 3200 psia and preferably greater than about 6000 psia) to cause elastic deformation of the passage restricting member 92 and high pressure tubing 104 at line contacts A and B, respectively. This elastic deformation creates metal-to-metal, substantially annular seal contacts at A and B, such that leakage of the slurry between the housing 90, insert 91, passage restricting member 92 and high pressure tubing 104 is substantially eliminated.

In this preferred embodiment, the passage restricting member 92 does not engage the housing 90 in the assembled state. That is, the housing 90 and passage restricting member 92 are dimensioned to provide a substantially annular space 98 therebetween. Similarly the retaining collar 110 is positioned on the high pressure tubing 104 to avoid engagement with the passage restricting member 92 and to provide a substantially annular space 112 therebetween.

The spaces 98, 112 extend adjacent the beveled surface 102 and beveled end 106, respectively, to the contact areas A, B, respectively. The vent 100 in the housing 90 communicates with the spaces 98 and 112 such that any leakage along seals A or B due to fluctuations in slurry pressure, wear, or improper sealing will flow out the vent 100. By cooperation of these features, including primarily the housing 90, insert 91, passage restricting member 92 and tubing 104, the orifice assembly defines a construction for controllably and directionally venting the orifice assembly 89.

Another aspect of this invention is shown in the preferred embodiment of FIG. 5. The orifice assembly 41, shown in FIGS. 3 and 4, is centrally mounted within a collar member 80. A substantially annular passage 84 interposes the orifice assembly 41 and the collar member 80 and communicates with the expansion zone 49. A collection vessel 82 is threaded onto the collar member 80 to define a collection chamber 21 adjacent the expansion zone 49.

Various reactant processing gases, such as oxygen, hydrogen and steam, are passed through the passage 84 into the collection chamber 21. The passage 84 directs the processing gases in a converging flow pattern towards the axis B—B of the orifice assembly 41 to mix the processing gases and slurry as soon as the slurry emerges from the opening 46 and shattering begins.

This mixing provides an exceptionally high level of reactivity between the gases and the shattered product due to the high surface area and surface energy of the comminuted particles immediately after the explosion. The topographic surface area of the exploded solid is approximately 20 to 30 times greater than the topographic surface area of the solid feed particles in the slurry. Reaction between the gases and the shattered particles occurs before the surface energies have been dissipated and before the surface areas have become contaminated by exposure to ambient atmosphere. In this preferred embodiment, mixing occurs within about 1 to about 3 microseconds after the surfaces are created.

Various preferred embodiments of the present invention have been disclosed. It is to be understood, however, that changes can be made without departing from the true scope and spirit of the present invention as set forth and defined in the following claims, which are to be interpreted in light of the foregoing specification.

What is claimed is:

1. An orifice assembly for passing a slurry from high temperature and pressure conditions to relatively low temperature and pressure conditions, comprising, in combination:
   (a) a housing made of material capable of withstanding the flow of an abrasive slurry at high temperature and pressure conditions and having an end wall, an internal chamber and a flange partially closing said internal chamber near said end wall and thereby defining an inner frusto conical surface that opens toward said internal chamber; and
   (b) an insert having an outer frusto conical surface that fits within said internal chamber in abutment and at least partially contacts with said inner frusto conical surface of said flange, and includes a substantially cylindrical passage extending through said insert and communicating with said internal chamber of said housing;
   (c) said flange, said insert, and said abuttment of said outer frusto conical tapered surface of said insert against said inner frusto conical surface of said flange defining means for retaining and sealing said insert within said chamber against the flow of slurry under high pressure conditions.

2. An orifice assembly as claimed in claim 1 wherein said insert further includes an end wall, said substantially cylindrical passage defining an axis of flow of said slurry out of said orifice assembly;
   said end wall of said housing and said end wall of said insert defining an exit end wall of said orifice assembly which forms an angle γ of approximately 90° or more with said axis.

3. An orifice assembly as claimed in claim 1 or 2 wherein a portion of said insert defines said substantially cylindrical passage, said portion being a wear resistant material.

4. An orifice assembly as claimed in claim 3 wherein said portion is composite diamond.

5. An orifice assembly as claimed in claim 3 wherein said insert is replaceable.

6. An orifice assembly as claimed in claim 3 wherein said portion is made of a wear resistant material capable of withstanding the flow of an abrasive slurry at high temperature and pressure, and said substantially cylindrical passage has a length in the range of approximately 75 micrometers to approximately 150 micrometers.

7. An orifice assembly as claimed in claim 2 wherein the slurry forms exploding solids immediately after passing through the orifice assembly, further comprising: (1) enclosure means for defining an expansion zone adjacent the exit end wall which is free of obstruction within the path of the exploding solids; and (2) mixer means for mixing reactant gases with said exploding solids within the expansion zone, said mixer means directing said reactant gases on a path which converges with said axis.

8. An orifice assembly as claimed in claim 7 wherein said mixer means includes a collar member surrounding said orifice assembly to define an annular passage therebetween.

9. An orifice assembly as claimed in claim 8 wherein said annular passage converges toward said substantially cylindrical passage of said insert such that the reactant gases are directed to flow toward said slurry emerging out of the orifice assembly.

10. An orifice assembly as claimed in claim 2 further comprising a collection chamber adjacent said exit end wall, said collection chamber defining an expansion zone which is free of obstruction within a distance from said substantially cylindrical passage at least as great as the path of the exploding solids.

11. An orifice assembly as claimed in claim 10 wherein said substantially cylindrical passage has a predetermined diameter and said distance is larger than approximately 20 times said predetermined diameter.

12. An orifice assembly as claimed in claim 11 wherein said distance is larger than approximately 50 times said predetermined diameter.

13. An orifice assembly as claimed in claim 11 wherein said distance is larger than approximately 100 times said predetermined diameter.

14. An orifice assembly for passing a slurry from high temperature and pressure conditions to relatively low temperature and pressure conditions, comprising, in combination:

a housing having a chamber therein, an end wall and a flange at one end thereof defining an inner frusto conical surface that opens toward said internal chamber;

an insert including an end wall and an outer frusto conical surface and being adapted to fit within said chamber such that said outer frusto conical surface of said insert abuts and makes at least partial contact with said inner frusto conical surface of said flange; and a high pressure tubing secured to said housing within said chamber, said high pressure tubing abutting said insert to form a seal therebetween and urging said insert against said flange to form a seal therebetween;

said insert and said high pressure tubing defining a passage through said housing, said passage including a substantially cylindrical portion adjacent said end wall of said insert and defining an axis;

said end wall of said housing and said end wall of said insert defining an exit end wall of said orifice assembly, said exit end wall and said axis defining an angle which is approximately 90° or more.

15. An orifice assembly as claimed in claim 14 wherein said insert is replaceable.

16. An orifice assembly as claimed in claim 14 wherein the seal formed between the high pressure tubing and the insert is a metal-to-metal seal.

17. An orifice assembly as claimed in claim 14 further comprising a passage-restricting member interposing said high pressure tubing and said insert, said high pressure tubing abutting said passage-restricting member to form a seal therebetween and urging said passage restricting member against said insert to form a seal therebetween and to, in turn, urge said insert against said flange to form a seal therebetween.

18. An orifice assembly as claimed in claim 17 wherein said housing, said insert, and said high pressure tubing cooperatively define vent means for controllably venting leakage of said slurry between said insert and said high pressure tubing.

19. An orifice assembly for passing a slurry from high temperature and pressure conditions to relatively low temperature and pressure conditions, comprising, in combination:

a housing made of a material capable of withstanding the flow of an abrasive slurry at high temperature and pressure conditions, said housing having an end wall and defining an internal passage chamber, said housing also including a flange partially closing said internal chamber to define an internal frusto conical surface facing said internal chamber; and an insert received by said housing within said internal chamber, said insert having an outer frusto conical surface for engagement and at least partial contact with said internal frusto conical surface of said flange, said insert defining a substantially cylindrical passageway extending through at least a portion of said insert, said internal passage chamber of said housing and said substantially cylindrical passageway of said insert being substantially coaxial to provide a passageway for flow of said slurry through said orifice assembly, said passageway defining a flow axis;

said insert and said end wall of said housing cooperating to define an exit end wall of said orifice assembly;

said internal frusto conical surface of said flange and said outer frusto conical surface of said insert cooperatively defining seal and retention means for retaining said insert within said housing against said flow of said slurry in a sealed relationship to substantially avoid leakage with said orifice assembly.

20. An orifice assembly as claimed in claim 19, further comprising, in combination:
(a) enclosure means for defining an expansion zone outside of the orifice and adjacent the exit end wall, which enclosure means is free of obstruction within the path of the exploding solids; and
(b) mixer means situation on said housing, said mixer means providing a flow passage for reactant gases which causes said reactant gases to mix with said exploding solids within the expansion zone, said mixer means directing said reactant gases on a path which converges with said flow of slurry out of said orifice.

21. An orifice assembly as claimed in claim 20 wherein said mixer means includes a collar member surrounding said orifice assembly to define an annular flow passage therebetween.

* * * * *